United States Patent
Strasik

(10) Patent No.: US 8,821,650 B2
(45) Date of Patent: Sep. 2, 2014

(54) MECHANICAL IMPROVEMENT OF RARE EARTH PERMANENT MAGNETS

(75) Inventor: Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 12/535,420

(22) Filed: Aug. 4, 2009

(65) Prior Publication Data

US 2011/0031432 A1 Feb. 10, 2011

(51) Int. Cl.
*H01F 1/01* (2006.01)
*C04B 35/06* (2006.01)

(52) U.S. Cl.
USPC ............. 148/101; 252/62.57; 252/62.51 R; 252/62.56

(58) Field of Classification Search
USPC ........................................... 148/101
See application file for complete search history.

(56) References Cited

U.S. PATENT DOCUMENTS

| | | |
|---|---|---|
| 3,982,971 A | 9/1976 | Yamanaka et al. |
| 4,063,970 A | 12/1977 | Steingroever |
| 4,065,330 A | 12/1977 | Masumoto et al. |
| 4,222,770 A | 9/1980 | Osumi et al. |
| 4,402,770 A | 9/1983 | Koon |
| 4,409,043 A | 10/1983 | Koon |
| 4,496,395 A | 1/1985 | Croat |
| 4,533,408 A | 8/1985 | Koon |
| 4,597,938 A | 7/1986 | Matsuura et al. |
| 4,601,875 A | 7/1986 | Yamamoto et al. |
| 4,663,066 A | 5/1987 | Fruchart et al. |
| 4,664,724 A | 5/1987 | Mizoguchi et al. |
| 4,684,406 A | 8/1987 | Matsuura et al. |
| 4,684,448 A | 8/1987 | Itoh et al. |
| 4,689,073 A | 8/1987 | Nate et al. |
| 4,734,131 A | 3/1988 | Arai et al. |
| 4,747,874 A | 5/1988 | Ghandehari |
| 4,747,924 A | 5/1988 | Itoh et al. |
| 4,765,848 A | 8/1988 | Mohri et al. |
| 4,767,450 A | 8/1988 | Ishigaki et al. |
| 4,767,455 A | 8/1988 | Jourdan |
| 4,770,702 A | 9/1988 | Ishigaki et al. |
| 4,770,723 A | 9/1988 | Sagawa et al. |
| 4,792,367 A | 12/1988 | Lee |
| 4,792,368 A | 12/1988 | Sagawa et al. |
| 4,801,340 A | 1/1989 | Inoue et al. |
| 4,802,931 A | 2/1989 | Croat |
| 4,814,139 A | 3/1989 | Tokunaga et al. |
| 4,836,868 A | 6/1989 | Yajima et al. |

(Continued)

FOREIGN PATENT DOCUMENTS

JP 09205017 A * 8/1997
WO WO 2009060831 A1 * 5/2009

OTHER PUBLICATIONS

The American Heritage Dictionary of the English Language, 1976, p. 1043.*
Machine translation of JP 09205017 A. Aug. 1997.*

(Continued)

*Primary Examiner* — Roy King
*Assistant Examiner* — Xiaowei Su
(74) *Attorney, Agent, or Firm* — Hanley, Flight & Zimmerman, LLC

(57) ABSTRACT

A process for mechanically strengthening a permanent magnet includes providing nanofibers or nanotubes, providing a ferromagnetic metal, defining a mixture by mixing the ferromagnetic metal with the nanofibers or nanotubes and sintering the mixture.

21 Claims, 2 Drawing Sheets

(56) References Cited

U.S. PATENT DOCUMENTS

| | | | |
|---|---|---|---|
| 4,837,109 A | 6/1989 | Tokunaga et al. |
| 4,842,656 A | 6/1989 | Maines et al. |
| 4,844,754 A | 7/1989 | Lee |
| 4,851,058 A | 7/1989 | Croat |
| 4,859,254 A | 8/1989 | Mizoguchi et al. |
| 4,865,660 A | 9/1989 | Nate et al. |
| 4,867,785 A | 9/1989 | Keem et al. |
| 4,875,946 A | 10/1989 | Heh et al. |
| 4,898,625 A | 2/1990 | Otsuka et al. |
| 4,902,360 A | 2/1990 | Ma et al. |
| 4,921,551 A | 5/1990 | Vernia et al. |
| 4,921,553 A | 5/1990 | Tokunga et al. |
| 4,935,074 A | 6/1990 | De Mooij et al. |
| 4,935,075 A | 6/1990 | Mizoguchi et al. |
| 4,952,239 A | 8/1990 | Tokunaga et al. |
| 4,968,347 A | 11/1990 | Ramesh et al. |
| 4,975,129 A | 12/1990 | Fujimura et al. |
| 4,975,130 A | 12/1990 | Matsuura et al. |
| 4,975,213 A | 12/1990 | Sakai et al. |
| 4,981,532 A | 1/1991 | Takeshita et al. |
| 4,983,232 A | 1/1991 | Endoh et al. |
| 4,994,109 A | 2/1991 | Willman et al. |
| 5,022,939 A | 6/1991 | Yajima et al. |
| 5,026,438 A | 6/1991 | Young et al. |
| 5,037,492 A | 8/1991 | Brewer et al. |
| 5,041,171 A | 8/1991 | Buschow et al. |
| 5,041,172 A | 8/1991 | Tokunaga et al. |
| 5,049,203 A | 9/1991 | Mukai et al. |
| 5,049,208 A | 9/1991 | Yajima et al. |
| 5,056,585 A | 10/1991 | Croat |
| 5,071,493 A | 12/1991 | Mizoguchi et al. |
| 5,093,076 A | 3/1992 | Young et al. |
| 5,096,512 A | 3/1992 | Sagawa et al. |
| 5,100,485 A | 3/1992 | Yamashita et al. |
| 5,114,502 A | 5/1992 | Bogatin |
| 5,135,584 A | 8/1992 | Fujiwara |
| 5,162,064 A | 11/1992 | Kim et al. |
| 5,164,023 A | 11/1992 | Tabaru et al. |
| 5,167,915 A | 12/1992 | Yamashita et al. |
| 5,172,751 A | 12/1992 | Croat |
| 5,174,362 A | 12/1992 | Croat |
| 5,178,692 A | 1/1993 | Panchanathan |
| 5,186,761 A | 2/1993 | Kobayashi et al. |
| 5,194,098 A | 3/1993 | Sagawa et al. |
| 5,209,789 A | 5/1993 | Yoneyama et al. |
| 5,213,631 A | 5/1993 | Akioka et al. |
| 5,223,047 A | 6/1993 | Endoh et al. |
| 5,228,930 A | 7/1993 | Nakayama et al. |
| 5,230,751 A | 7/1993 | Endoh et al. |
| 5,250,206 A | 10/1993 | Nakayama et al. |
| 5,281,250 A | 1/1994 | Hamamura et al. |
| 5,309,977 A | 5/1994 | Yoneyama et al. |
| 5,338,520 A | 8/1994 | Leveque et al. |
| 5,403,408 A | 4/1995 | Krause et al. |
| 5,411,608 A | 5/1995 | Hazelton et al. |
| 5,449,417 A | 9/1995 | Shimizu et al. |
| 5,460,662 A | 10/1995 | Kobayashi et al. |
| 5,514,224 A | 5/1996 | Panchanathan |
| 5,545,266 A | 8/1996 | Hirosawa et al. |
| 5,549,766 A | 8/1996 | Tsutai et al. |
| 5,567,891 A | 10/1996 | Bogatin et al. |
| 5,591,276 A | 1/1997 | Yoshizawa et al. |
| 5,591,535 A | 1/1997 | Hisano et al. |
| 5,597,425 A | 1/1997 | Akioka et al. |
| 5,626,690 A | 5/1997 | Matsuki et al. |
| 5,634,987 A | 6/1997 | Zhang et al. |
| 5,643,491 A | 7/1997 | Honkura et al. |
| 5,645,651 A | 7/1997 | Fujimura et al. |
| 5,647,886 A | 7/1997 | Kitazawa et al. |
| 5,656,100 A | 8/1997 | Yamamoto et al. |
| 5,665,177 A | 9/1997 | Fukuno et al. |
| 5,674,327 A | 10/1997 | Yamamoto et al. |
| 5,690,752 A | 11/1997 | Yamamoto et al. |
| 6,019,859 A | 2/2000 | Kanekiyo et al. |
| 6,120,620 A | 9/2000 | Benz et al. |
| 6,143,190 A | 11/2000 | Yagi et al. |
| 6,168,673 B1 | 1/2001 | Kanekiyo et al. |
| 6,211,589 B1 | 4/2001 | Ahlstrom |
| 6,250,984 B1* | 6/2001 | Jin et al. ............... 445/51 |
| 6,261,387 B1 | 7/2001 | Panchanathan |
| 2003/0156964 A1* | 8/2003 | Kikuchi ............... 419/34 |
| 2010/0255292 A1* | 10/2010 | Shintani et al. ............ 428/335 |
| 2011/0031431 A1* | 2/2011 | Hull et al. ............ 252/62.54 |

OTHER PUBLICATIONS

Tokoro et al. Journal of Materials Chemistry, 2004, 14, p. 253-257.*
C.H. Chen, M.S. Walmer, M.H. Walmer, S. Liu, E. Kuhl, "Sm2(Co,Fe,Cu,Zr) 17 Magnets for Use at Temperature 400° C.," Journal of Applied Physics 83, No. 11, (1998), pp. 6706-6708, published by the American Institute of Physics, 4 pages.
J.F. Liu, Y. Zhang, D. Dimitrov, G.C. Hadjipanayis, "Microstructure and High Temperature Magnetic Properties of SM(Co,Cu,Fe,Zr)z (z=6.7-9.1) Permanent Magnets," Journal of Applied Physics 85, (No. 5, (1999), pp. 2800-2806, publhished by the American Institute of Physics, 6 pages.
J. Zhou, R. Skomski, C. Chen, G.C. Hadjipanayis, D.J. Sellmyer, "SM-CO-CU-Ti High Temperature Permanent Magnets," Applied Physics Letters 77, No. 10, (2000), pp. 1514-1517, published by the American Institute of Physics, 4 pages.
H.A. Shute, J.C. Mallinson, D.T. Wilton, D.J. Mapps, "Correction to One-Sided Fluxes in Planar, Cylindrical, and Spherical Magnetized Structures," IEEE Transactions of Magnetics, vol. 36, No. 6, (Nov. 2000), pp. 440-453, 13 pages.
Mallinson, J.C., "One-Sided Fluxes-A Magnetic Curiosity?" IEEE Transactions on Magnetics, vol. Mag-9, No. 4, (Dec. 1973), pp. 678-682, 5 pages.
Jens H. Jensen, Manlio G. Abele, "Closed Wedge Magnets," IEEE Transactions on Magnetics, vol. 35, No. 5. (Sep. 1999), pp. 4192-4199, 8 pages.
Cugat, O., "Rare Earth Permanent Magnet Applications in Magmas," Rinton Press, Inc., (1998),16 pages.
Halbach, K., "Design of Permanent Multipole Magnets with Oriented Rare Earth Cobalt Material," Nuclear Instruments and Methods 169,(1980), pp. 1-10, published by North-Holland Publishing CO.,10 pages.
T.R. Ni Mhiochain, D. Weaire, S.M. McMurry, J.M.D. Coey, "Anaylsis of Torque in Nested Magnetic Cylinders," Journal of Applied Physics 86, No. 11, (1999), pp. 6412-6425, published by the American Institute of Physics,14 pages.
O. Cugat, P. Hansson, J.M.D. Coey, "Permanent Magnet Variable Flux Sources," IEEE Transaction on Magnetics, vol. 30, No. 6, (Nov. 1994), pp. 4602-4605, 3 pages.
K.H. Muller, G. Krabbes, J. Fink, S. Grub, A. Kirchner, G. Fuchs, L. Schultz, "New Permanent Magnets," Journal of Magnetism and Magnetic Materials, 226-230, (2001), pp. 1370-1376, published by Elsevier Science B.V., 7 pages.
J.M.D. Coey, Stephen Cass, "Magnetic Water Treatment," Journal of Magnetism and Magnetic Materials, 209, (2000), pp. 71-74, published by Elsevier Science B.V., 4 pages.
A. Szkatula, M. Balanda, M. Kopec, "Magnetic Treatment of Industrial Water. Silica Activation," The European Physical Journal Applied Physics 18, (2002), pp. 41-50, 9 pages.
S. Kobe, G. Drazic, P.J. McGuiness, J. Strazisar, "The Influence of the Magnetic Field on the Crystallisation Form of Calcium Carbonate and the Testing of a Magnetic Water-Treatment Device," Journal of Magnetism and Magnetic Materials 236, (2001), pp. 71-76, published by Elsevier Science B.V., 6 pages.
Lundager Madsen, H.E., "Influence of Magnetic Field on the Precipitation of Some Inorganic Salts," Journal of Crystal Growth 152, (1995), pp. 94-1000, published by Elsevier Science B.V., 7 pages.
G. Hinds, J.M.D. Coey, M.E.G. Lyons, "Influence of Magnetic Forces on Electrochemical Mass Transport," Electrochemistry Communications 3, (2001), pp. 215-218, published by Elsevier Science B.V., 4 pages.
Mogi, Iwao, "Control of the Dopant-Exchange Process in Polypyrrole by a Magnetic Field," Institute for Materials Research, Tohoku University, vol. 25, issue 1,(1996), pp. 53-54, published by Chemical Society of Japan and Chemistry Letters 196, 2 pages.

(56) References Cited

OTHER PUBLICATIONS

Coey, J.M.D., "Permanent Magnet Applications," Journal of Magnetism and Magnetic Materials 248, (2002), pp. 441-456, published by Elsevier Science B.V.,16 pages.

Y. Chen, L.T. Chadderton, J.S. Williams, J. Fitz Gerald, "Solid-State Formation of Carbon and Boron Nitride Nanotubes," Materials Science Forum, vols. 343-346, (2000), and J. of Metastable and Nanocrystalline Materials vol. 8 (2000) pp. 63-67, published by Trans Tech Publications, Switzerland, 5 pages.

Y. Chen, M. Conway, J.S. Williams, "Large-Quantity Production of High-Yield Boron Nitride Nanotubes," J. Mater. Res., vol. 17, No. 8, (Aug. 2002), pp. 1896-1899, published by Materials Research Society, 4 pages.

Renhi MA, Yoshio Bando, Tadao Sato, Keiji Kurashima, "Growth Morphology, and Structure of Boron Nitride Nanotubes," Chem. Mater. 13, vol. 13, (2001), pp. 2965-2971, published by American Chemical Society, 7 pages.

Renzhi MA, Yoshio Bando, Hongwei Zhu, Tadao Sato, Cailu Xu, Dehai Wu, "Hydrogen Uptake in Boron Nitride Nanotubes at Room Temperature," J. Am.Chem. Soc. vol. 124, (2002), pp. 7672-7673, published by the American Chemical Society, 2 pages.

Takeo Oku, Masaki Kuno, Ichihito Narita, "Hydrogen Storage in Boron Nitride Nanomaterials Studied by TG/DTA and Cluster Calculation," Journal of Physics and Chemistry of Solids, vol. 65, (2004), pp. 549-552, published by Elsevier Ltd., 6 pages.

Janet Hurst, David Hull, Daniel Gorican "Synthesis of Boron Nitride Nanotubes for Engineering Applications," Nasa Glenn Research Center, (2002), published by Carbon Nanotechnologies, Inc., 8 pages.

Nasreen G. Chopra, A. Zettl, Measurement of the Elastic Modulus of Multi-Wall Boron Nitride Nanotube, Solid State Communications, vol. 105, No. 5, (1998), pp. 297-300, published by Elsevier Science Ltd., 4 pages.

Blase et al., "Stability and Band Gap Constancy of Boron Nitirde Nanotubes," Europhys Lett 28 (5),IOP (1994), pp. 335-340, 6 pages.

L. Bourgeois, Y. Bando, T. Sato, Tubes of Rhombohedral Boron Nitride, J. Phys. Appl. Phys. 33, (2000), pp. 1902-1908 published by IOP Publishing Ltd., 7 pages.

S.M. Nakhmanson, A. Calzolari, V. Meunier, J. Bernholc, M. Buongiorno Nardelli, "Spontaneous Polarization and Piezoelectricity in Boron Nitride Nanotube," Physical Review B 67, 235406, (2003), published by The American Physical Society, 5 pages.

Rahul Sen, B.C. Satishkumar, A. Govindaraj, K.R. Harikumar, Gargi Raina, Jin-Ping Zhang, A.K. Cheetham, C.N.R. Rao, "B-C-N, C-N and B-N Nanotubes Produced by the Pyrolysis of Precursor Molecules over CO Catalysts," Chemical Physics Letter 287, (1998), pp. 671-676, published by Elsevier science B.V., 6 pages.

R. MA, Y. Bando, T. Sato, "CVD Synthesis of Boron Nitride Nanotibes without Metal Catalysts," Chemical Physics Letter 337, (2001), pp. 61-64, published by Elsevier Science B.V., 4 pages.

Nasreen G. Chopra, R.J. Luyken, K. Cherrey, Vincent H. Crespi, Marvin L. Cohen, Steven G. Louie, A. Zettl, "Boron Nitride Nanotubes," Science vol. 269, (Aug. 19, 2005), pp. 966-967, retrieved from sciencemag.org. on Mar. 14, 2012, 2 pages.

D.P. Yu, X.S. Sun, C.S. Lee, I. Bello, S.T. Lee, "Synthesis of Boron Nitride Nanotubes by Means of Excimer Laser Ablation at High Temperature," Appl. Phys. Lett. 72, No. 16, (1966) provided by American Institute of Physics (1998), 4 pages.

D.Y. Li, J.A. Szpunar, "Modeling of the Texture Formation in Electro-Deposited Metal Films," Mat. Res. Soc. Symp. Proc vol. 343, (1994), published by Materials Research Society, 6 pages.

J.M.D. Coey, "Permanent magnet applications," Journal of Magnetism and Magnetic Materials, 248, (2002), pp. 441-456, published by Elsevier Science B.V., 16 pages.

J.M.D. Coey, O. Cugat, "Construction and Evaluation of Permanent Magnet Variable Flux Sources," 13th International Workshop on RE Magnets & their Applications, Birmingham (1994), pp. 41-54, 14 pages.

R. Hanitsch, "Permanent-magnet motors," Rare-Earth Iron Permanent Magnets, Ch. 10, Oxford (1996), pp. 452-497, published by Claredon Press, 47 pages.

H.A. Leupold, "Static applications," Rare-Earth Iron Permanent Magnets, Ch. 8, Oxford (1996), pp. 381-429, published by Claredon Press, 49 pages.

D. Howe, "Actuators," Rare-Earth Iron Permanent Magnets, Ch. 11, Oxford (1996), pp. 498-512, published by Claredon Press, 15 pages.

D. Larkin, "Research and Technology 2011," National Aeronautics and Space Administration John H. Glenn Research Center at Lewis Field, NASA/TM-2002-211333, (2001), published by NASA Center for Aerospace Information, 251 pages.

J.M.D. Coey, Treasa R. Ni Mhiochain, "Permanent Magnets," High Magnetic Fields, Science and Technology, vol. 1, (2003), pp. 25-47, 26 pages.

H. Zijlstra, "Permanent Magnet Systems for NMR Tomography," Philips Journal of Research, vol. 40, No. 5, (1985), pp. 259-288, 30 pages.

J.P. Yonnet, "Magnetomechanical devices," Rare-Earth Iron Permanent Magnets, Ch. 9, Oxford (1996), pp. 430-451, published by Claredon Press, 22 pages.

* cited by examiner

US 8,821,650 B2

MECHANICAL IMPROVEMENT OF RARE EARTH PERMANENT MAGNETS

FIELD OF THE INVENTION

The present disclosure generally relates to rare earth permanent magnets. More particularly, the present disclosure relates to a process for mechanically strengthening rare earth permanent magnets by sintering the magnet raw materials with carbon and boron nanofibers or nanotubes.

BACKGROUND OF THE INVENTION

Rare-earth iron permanent magnets combine the magnetization of iron or cobalt with the anisotropy of a light rare-earth metal in intermetallic compounds which exhibit nearly ideal hysteresis. The rare-earth iron magnets may be indispensable components in a vast range of electronic and electromechanical devices. The mechanical strength of rare-earth permanent magnets may be limited by the sintered nature of these materials. In order to use these magnets in rotating machinery applications such as motors, generators and flywheel bearings, for example and without limitation, the magnets may require structural strengthening or reinforcement.

Permanent magnets used in rotating machinery may utilize metal or composite overwrap to increase their design limit for high speed rotation. However, the performance limits of permanent magnets with overwrap may still be limited. Moreover, the physical overwrap of permanent magnets may increase the cost and complexity of the system which utilizes the magnet and may also hinder or limit inspection of the magnet, reduce emission of heat from the system and limit application of the system to medium speeds of the magnet.

Therefore, a process for intrinsically strengthening rare earth permanent magnets on a molecular scale by sintering the magnet raw materials with carbon and boron nanofibers or nanotubes is needed.

SUMMARY

The present disclosure is generally directed to a process for mechanically strengthening a permanent magnet. Generally, the process may include providing nanofibers or nanotubes; providing a ferromagnetic metal; defining a mixture by mixing the ferromagnetic metal with the nanofibers or nanotubes; and sintering the mixture.

In some embodiments, the process may include providing nanofibers or nanotubes; providing a ferromagnetic metal and a rare earth metal; defining a mixture by mixing the ferromagnetic metal and the rare earth metal with the nanofibers or nanotubes; pressing and shaping the mixture; and sintering the mixture.

In some embodiments, the process may include processing carbon and boron nitride nanofibers or nanotubes by reacting amorphous carbon and boron powder with ammonia in the presence of iron catalyst particles; providing iron oxide and a rare earth metal; defining a mixture by mixing the iron oxide and the rare earth metal with the nanofibers or nanotubes; pressing and shaping the mixture; and sintering the mixture.

In some embodiments, the process may include processing carbon and boron nitride nanofibers or nanotubes by reacting amorphous carbon and boron powder with ammonia in the presence of iron catalyst particles at a temperature of from about 1100 degrees C. to about 1400 degrees C. for a time period of from about 20 minutes to about 2 hours; providing oxides of iron, neodymium and boron; defining a mixture by mixing the oxides of iron, neodymium and boron with the nanofibers or nanotubes; pressing and shaping the mixture; and sintering the mixture at a temperature of between about 1,000 degrees and about 3,000 degrees C.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

The present disclosure is directed to a process for mechanically strengthening rare earth permanent magnets in which carbon and boron nitride (BN) nanofibers or nanotubes or nanotubes (hereinafter nanofibers or nanotubes) are used to mechanically strengthen the sintered permanent magnet material. An iron-based catalyst may be used in processing of the nanofibers or nanotubes. The chemistry of the carbon-based and boron-based nanofibers or nanotubes which is derived from the iron-based catalyst may be compatible with permanent magnet raw materials. In some embodiments, oxides of iron, neodymium and boron) may be mixed together, pressed and sintered to fabricate an NdFeB permanent magnet. Additionally, boron nitride nanofibers or nanotubes are chemically compatible with the permanent magnet stoichiometry.

Due to the sintering process which is used for their fabrication, permanent magnets may be structurally weak. On the other hand, carbon and boron nitride nanofibers or nanotubes are among the strongest known materials. The size of the carbon and boron nitride nanofibers or nanotubes is such that the nanofibers or nanotubes will significantly strengthen the matrix of the permanent magnet without interfering with the uniformity or strength of the permanent magnet domains which are required to produce magnets with very high magnetic field capability.

Figure 1:
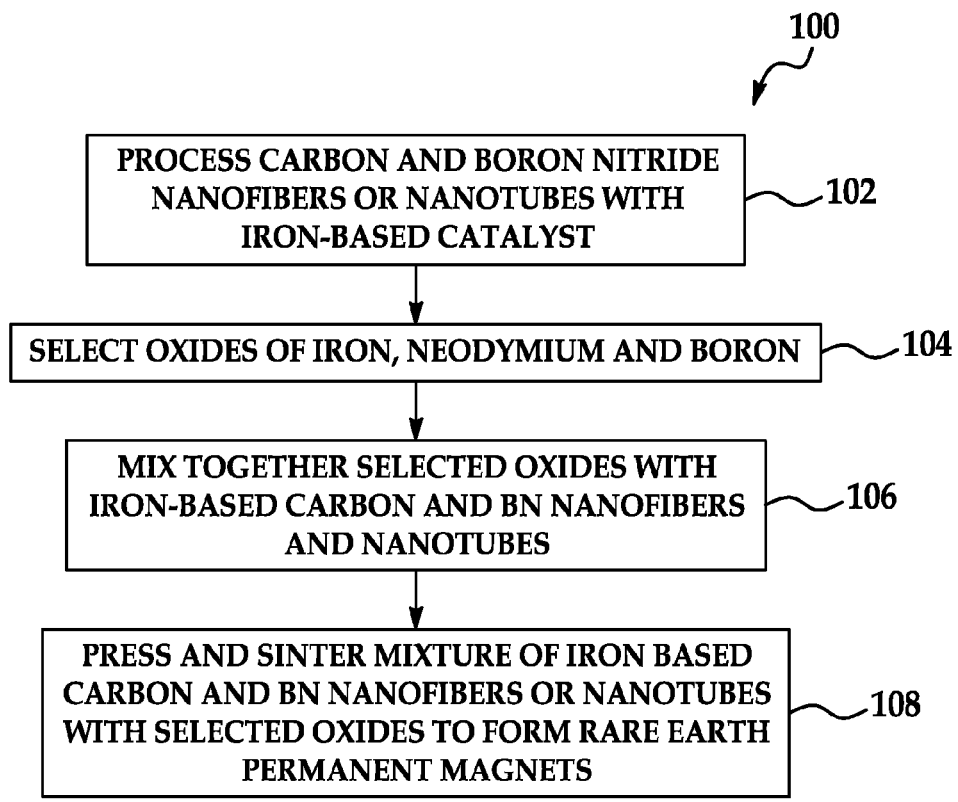
FIG. 1 is a flow diagram of an illustrative embodiment of a process for mechanically strengthening rare earth permanent magnets.

Referring initially to FIG. 1, a flow diagram 100 of an illustrative embodiment of a process for mechanically strengthening rare earth permanent magnets is shown. In block 102, carbon and boron nitride nanofibers or nanotubes are processed with an iron-based catalyst. In block 104, in some embodiments of the process, oxides of iron, neodymium and boron may be selected. In some embodiments, cobalt and other materials such as nickel and/or rare earth metals may be used. In some embodiments, an oxide of a rare earth metal may be used. In block 106, the selected metal oxides are mixed with the iron-based carbon and boron nanofibers or nanotubes. In block 108, the mixture of iron-based carbon and boron nanofibers or nanotubes and the selected oxides are pressed, shaped and sintered to form rare earth permanent magnets.

Figure 2:
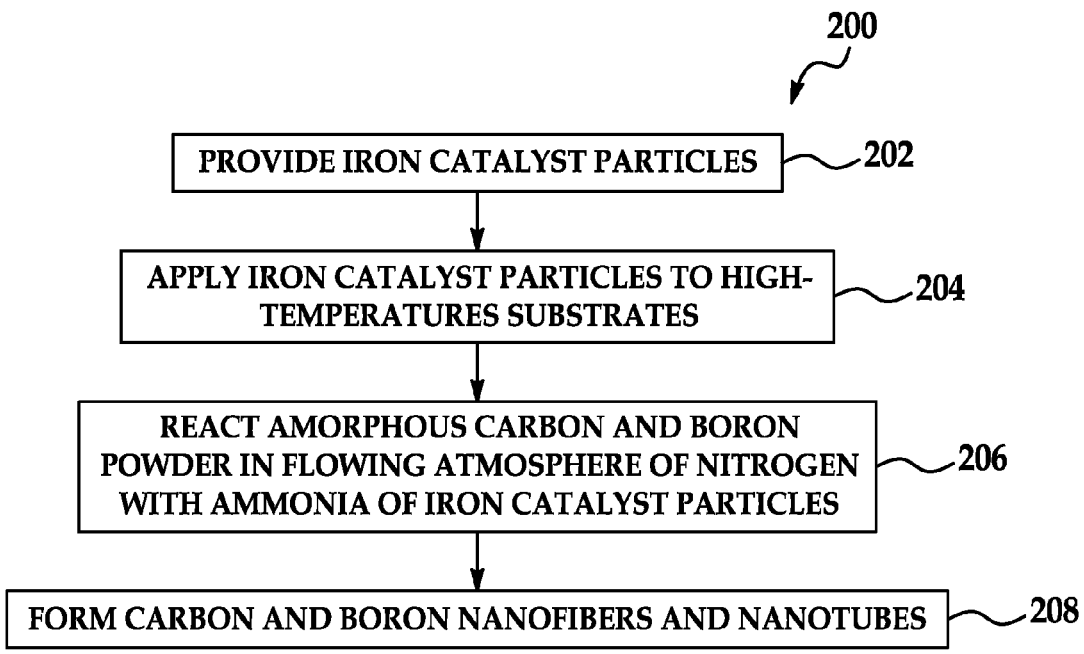
FIG. 2 is a flow diagram of an exemplary process for processing carbon and boron nanofibers or nanotubes in implementation of the process for mechanically strengthening rare earth permanent magnets.

Referring next to FIG. 2, a flow diagram 200 of an exemplary process for processing carbon and boron nitride nanofibers or nanotubes (block 102 in FIG. 1) in implementation of the process for mechanically strengthening rare earth permanent magnets is shown. In block 202, iron catalyst particles may be provided. In block 204, the iron catalyst particles may be applied to high-temperature substrates such as alumina, silicon carbide, platinum and/or molybdenum, for example and without limitation. In block 206, amorphous carbon and boron powder may be reacted with a small quantity of ammonia in a flowing atmosphere of nitrogen in the presence of the iron catalyst particles. The iron catalyst particles may be added to the reaction mixture in the range of up to several weight percent. Prior to reaction of the carbon and boron powder with the ammonia in block 206, the iron catalyst particles may be briefly milled with a hydrocarbon solvent and ceramic grinding medium. Reaction temperatures may range from about 1100 degrees C. to about 1400 degrees C. for from about 20 minutes to about 2 hours. In block 208, the carbon and boron nanofibers or nanotubes may be formed as a result of the reaction in block 206.

Figure 3:
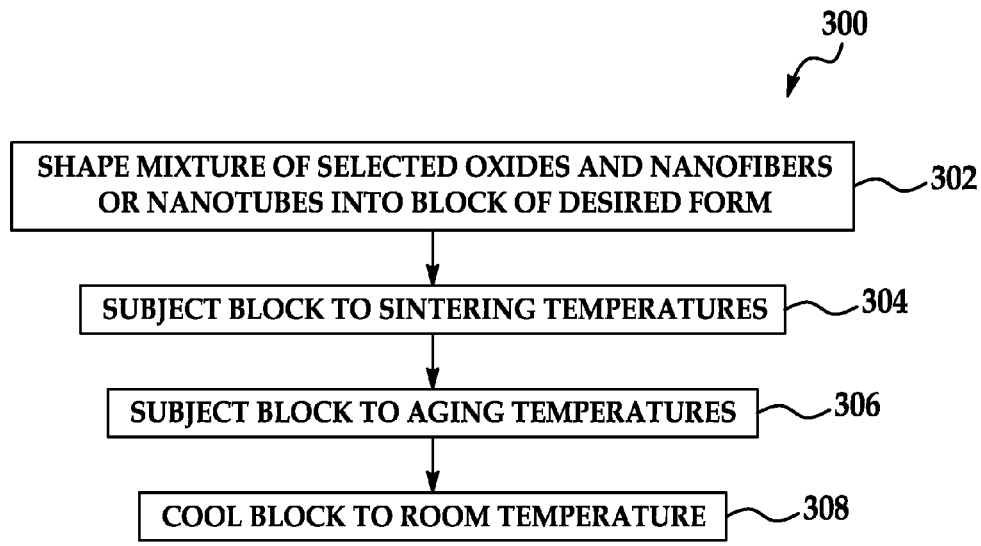
FIG. 3 is a flow diagram of an exemplary process for sintering the carbon and boron nanofibers or nanotubes with the magnet raw materials in fabrication of the rare earth permanent magnets.

Referring next to FIG. 3, a flow diagram 300 of an exemplary process for sintering the carbon and boron nanofibers or nanotubes with the magnet raw materials (block 108 in FIG. 1) in fabrication of the rare earth permanent magnets is shown. In block 302, the mixture of selected oxides and nanofibers or nanotubes is shaped into a block of desired form. In block 304, the block is subjected to sintering temperatures. In some embodiments, the block may be subjected to sintering at a temperature of between about 1,000 degrees and about 3,000 degrees C., preferably between about 1,170 degrees and about 1,270 degrees C. In block 306, in some embodiments the block may next be subjected to aging temperatures of between about 800 degrees and about 900 degrees C. In block 308, the block may be cooled to room temperature. The rare earth permanent magnet block may be fabricated in the form of the part which is to be utilized in the motor, generator, flywheel, bearing or other dynamic application of the magnet.

Figure 4:
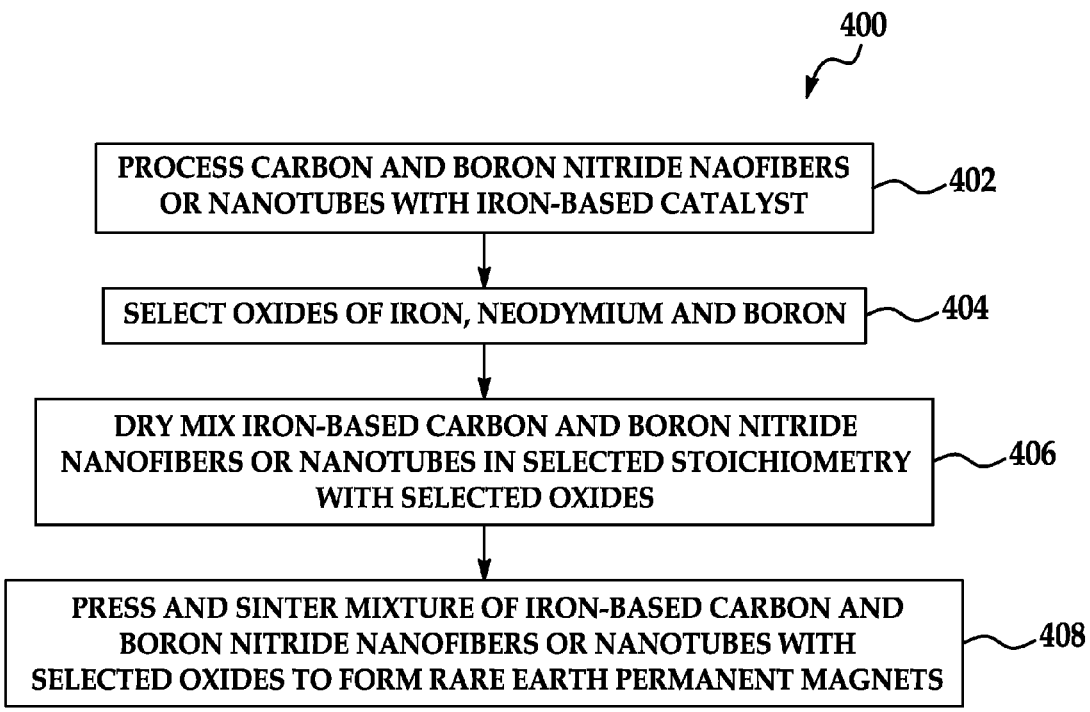
FIG. 4 is a flow diagram of an alternative illustrative embodiment of a process for mechanically strengthening rare earth permanent magnets.

Referring next to FIG. 4, a flow diagram 400 of an alternative illustrative embodiment of a process for mechanically strengthening rare earth permanent magnets is shown. In block 402, carbon and boron nitride nanofibers or nanotubes may be processed with an iron-based catalyst. This step may be carried out according to the process which was heretofore described with respect to FIG. 2. In block 404, oxides of iron, neodymium and boron may be selected. In block 406, the nanofibers or nanotubes may be dry-mixed in a selected stoichiometry with the oxides selected in block 404. In block 408, the mixture of nanofibers or nanotubes may be pressed and sintered with the selected oxides to form the rare earth permanent magnets. This step may be carried out according to the process which was heretofore described with respect to FIG. 3.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A process for mechanically strengthening a permanent magnet, comprising:
    forming carbon and boron-nitride nanofibers or nanotubes by applying catalyst particles to a substrate and reacting amorphous carbon and boron powder with ammonia in the presence of the catalyst particles;
    selecting one or more metal oxides;
    defining a mixture by mixing the metal oxide with the nanofibers or nanotubes; and
    pressing and sintering the mixture to form the permanent magnet.

2. The process of claim 1, further comprising selecting the substrate from the group consisting of alumina, silicon carbide, platinum and molybdenum.

3. The process of claim 1, wherein forming the nanofibers or nanotubes comprises forming the nanofibers or nanotubes with iron-based catalyst particles.

4. The process of claim 1, wherein selecting one or more of the metal oxides comprises selecting an oxide of iron, or an oxide of a rare earth metal.

5. The process of claim 1, wherein selecting one or more of the metal oxides comprises selecting an oxide of iron and an oxide of neodymium.

6. The process of claim 1 wherein the mixture further comprises boron oxide.

7. A process for mechanically strengthening a rare earth permanent magnet, comprising:
    forming carbon and boron-nitride nanofibers or nanotubes by applying catalyst particles to a substrate and reacting amorphous carbon and boron powder with ammonia in a flowing atmosphere of nitrogen in the presence of the catalyst particles;
    selecting one or more oxides and a rare earth metal;
    defining a mixture by mixing the oxide and the rare earth metal with the nanofibers or nanotubes;
    pressing and shaping the mixture; and
    sintering the mixture to form the permanent magnet.

8. The process of claim 7 wherein forming the carbon and boron-nitride nanofibers or nanotubes comprises forming the carbon and boron-nitride nanofibers or nanotubes with iron-based catalyst particles.

9. The process of claim 7, wherein selecting the oxide comprises selecting iron oxide, neodymium oxide, and boron oxide.

10. A process for mechanically strengthening a rare earth permanent magnet, comprising:
    forming carbon and boron nitride nanofibers or nanotubes by applying iron catalyst particles to substrates and reacting amorphous carbon and boron powder with ammonia in a flowing atmosphere of nitrogen in the presence of the iron catalyst particles;
    selecting one or more oxides;
    defining a mixture by mixing the oxide with the nanofibers or nanotubes;
    pressing and shaping the mixture; and
    sintering the mixture to form the permanent magnet.

11. A process for mechanically strengthening a permanent magnet, comprising:
    forming carbon and boron-nitride nanofibers or nanotubes by applying iron catalyst particles to substrates and reacting amorphous carbon and boron powder with ammonia in a flowing atmosphere of nitrogen in the presence of the iron catalyst particles at a temperature of from about 1100 degrees C. to about 1400 degrees C. for a time period of from about 20 minutes to about 2 hours;
selecting one or more metal oxides;
defining a mixture by mixing the nanofibers or nanotubes with the metal oxide; and
pressing and sintering the mixture to form the permanent magnet.

12. The process of claim 1, wherein forming the carbon and boron nitride nanotubes or nanofibers comprises synthesizing the carbon and boron nitride nanotubes or nanofibers.

13. The process of claim 7, wherein selecting one or more of the oxides comprises selecting one or more of iron oxide, neodymium oxide, or boron oxide.

14. The process of claim 9, further comprising mixing the iron oxide, neodymium oxide, and boron oxide with the carbon and boron nitride nanotubes or nanofibers.

15. The process of claim 10, wherein reacting amorphous carbon and boron powder with ammonia in a flowing atmosphere of nitrogen in the presence of the iron catalyst particles occurs at a temperature from about 1100 degrees C. to about 1400 degrees C. for a time period of about 20 minutes to about 2 hours.

16. The process of claim 10, wherein sintering the mixture occurs at a temperature of between about 1,000 degrees and about 3,000 degrees C.

17. The process of claim 15, wherein sintering the mixture occurs at a-temperature of between about 1,000 degrees and about 3,000 degrees C.

18. The process of claim 10, wherein forming the carbon and boron nitride nanotubes or nanofibers comprises synthesizing the carbon and boron nitride nanotubes or nanofibers.

19. The process of claim 10, wherein mixing the oxide with the nanofibers or nanotubes comprises dry mixing.

20. The process of claim 11, wherein selecting one or more of the metal oxides comprises selecting oxides of iron, or neodymium.

21. The process of claim 11, wherein mixing the nanofibers or nanotubes with the metal oxide comprises dry mixing the nanofibers or nanotubes in a selected stoichiometry with the metal oxide.

\* \* \* \* \*